Dec. 16, 1941.  D. B. BAKER ET AL  2,266,581
CLUTCH
Filed Sept. 22, 1939
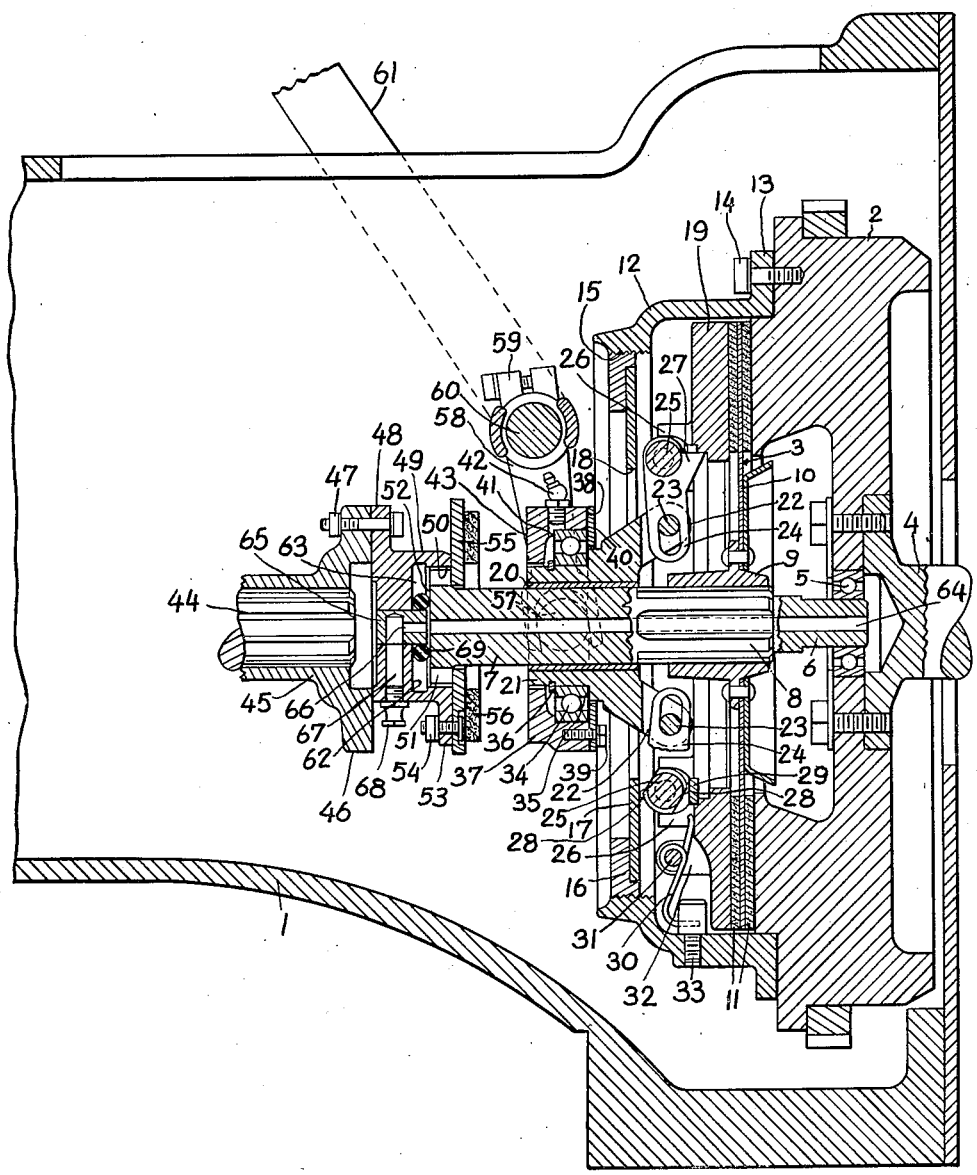
INVENTORS
D.B. BAKER
C.R. ROGERS
W.O. BECHMAN
BY Paul O Pippel
ATTY.

Patented Dec. 16, 1941

2,266,581

UNITED STATES PATENT OFFICE 2,266,581

CLUTCH

David B. Baker, Riverside, Clifford R. Rogers, Oak Park, and William O. Bechman, Chicago, Ill., assignors to International Harvester Company, a corporation of New Jersey Application September 22, 1939, Serial No. 296,102

3 Claims. (Cl. 192—113)

This invention relates to a clutch and more particularly to an improved construction which provides a coupling between the clutch shaft and a shaft to be driven by the clutch.

The invention contemplates and has for one of its principal objects the provision of an improved coupling member which has formed therein a lubricant passage communicating with a lubricating bore formed in the clutch shaft and communicating with the clutch pilot bearing.

Another principal object of the invention is the provision of improved brake means for decreasing the speed of the clutch shaft when the clutch is disengaged.

An improved object is to actuate the brake means by the means serving also to actuate the clutch release means.

Another object is to provide the brake means as a component part of the coupling means which interconnects the clutch shaft with a shaft to be driven thereby.

Another object is to provide the coupling member as a separable part adapted to be connected to and disconnected from its position between the proximate ends of the clutch shaft and the other shaft.

Another object is to provide a lubricant seal for sealing the junction between the passage in the coupling and the lubricating bore in the clutch shaft.

Briefly, these and other desirable objects and important features of the invention are achieved in one preferred construction wherein the clutch consists of a driven member and a driving member releasably interengageable and including means for effecting engagement and disengagement thereof. The driven member is provided with a pilot bearing which journals one end of a clutch shaft, the driving member of the clutch being carried on this shaft for rotation therewith. A transmission shaft or the like is arranged at the other end of the clutch shaft in axial alinement therewith, and a coupling member is provided for interconnecting these two shafts for rotation. The coupling member is formed with a lubricant passage communicating with an axial bore in the clutch shaft, which bore in turn communicates with the pilot bearing in the driven member. The coupling member further carries for rotation therewith and with the clutch shaft a brake member adapted to be engaged by a clutch throw-out member, which is provided to actuate the clutch release means.

A more complete understanding of these and other objects of the invention may be had from the following detailed description taken in conjunction with the accompanying sheet of drawing wherein the single figure illustrates a longitudinal sectional view through a clutch construction embodying preferred forms of the aforesaid improvements.

The particular clutch chosen for purposes of illustration is an engine clutch of the over-center type which is conventionally disposed between the engine and the transmission of a vehicle. The clutch housing of a vehicle is generally indicated at 1 and contains therein the engine clutch which consists generally of a driving member 2, in the form of an engine fly-wheel, and a driven member 3. The driving member or fly-wheel 2 is connected in the usual manner to the annular flange at the rear end of an engine crank-shaft 4. The driving member carries in a cylindrical opening at its center a pilot bearing 5 which serves to journal the inner reduced end 6 of a clutch shaft 7. This shaft 7 is provided with a splined portion 8 just rearwardly of the reduced portion 6. This splined portion carries thereon for rotation therewith a hub 9 carrying a disk or plate 10 comprising part of the clutch driven member 3. The disk 10 carries at opposite sides thereof for rotation therewith a pair of clutch friction plates or disks 11. One of these disks 11 is engageable with the rear radial face of the clutch driving member in the usual manner.

The clutch further includes a back plate 12 formed as a large cup-shaped member including a radially outwardly extending annular flange 13 at its inner end. This flange is secured by a plurality of bolts 14 to a rear face portion of the driven member or fly-wheel 2. The rearward face of the back plate 12 is open and internally threaded, as at 15. An externally threaded ring 16 is threaded into this opening and carries an annular ring plate 17 formed with a comparatively large central opening 18, which is generally coaxial with the openings formed in the ring 16 and the rear face of the back plate 12.

A pressure plate 19 is carried within the back plate 12 and is formed with a radial front face engaging the rearward friction disk 11. The clutch driven member 3 is thus engaged between the driving member 2 and the pressure plate 19 in the usual manner.

As previously mentioned the clutch shaft 7 extends axially rearwardly of the clutch driven member. This portion of the shaft is substantially cylindrical and carries thereon a sleeve or bushing 20, which in turn carries a throw-out collar 21 having forwardly extending arms 22 carrying transversely disposed pins 23. Each pin is connected to a release arm 24 carried rigidly at one end on a cross-shaft 25. This shaft 25 is rotatably carried in a pair of bifurcated ears 26 (only one of which is shown for each shaft), carried by the pressure plate 19. The radially innermost ends of the arms 24 are slotted and through these slots engage the pins 23 carried by the arms 22 of the throw-out collar 21. Each arm 24 is provided with a forwardly extending lug 27 engageable with an inner, annular shoulder formed on the pressure plate 19. A portion of each cross-shaft 25 is enlarged and provided with a pair of diametrically opposed camming members 28. One of these members engages the inner annular face of the ring plate 17 and the other engages a small member or strip 29 carried at the rear face of the pressure plate 19. This is best shown in the drawing at the lower portion of the clutch. The shaft 25 in the position shown urges the pressure plate 19 forwardly toward the fly-wheel 2, thus holding the driven member 3 in driving engagement with the driving member. Axial shifting of the throw-out collar 21 rearwardly rotates the shaft 25, thus moving the camming members 28 out of engagement with their respective engageable portions. The pressure plate 19 is moved rearwardly through the action of a plurality of springs 30, only one of which is shown. Each spring 30 is carried on a pin 31 carried in a pair of spaced ears 32, only one of which is shown. The spring is wrapped around the pin 31 and has oppositely extending ends, one of which engages a rear portion of the pressure plate 19 and the other of which engages a stud 33 carried in the annular wall portion of the back plate 12. The construction previously described is generally conventional in clutches of the over-center type and has not, therefore, been illustrated in detail. The operation of such a clutch is well known to those skilled in the art and the preceding general description thereof will be sufficient for the purposes of the present invention.

The previously described arms and shafts 24 and 25 provide over-center release means or mechanism operable to interrupt and establish driving engagement between the driving and driven clutch members 2 and 3. The actuation of the release means is effected through axial shifting of the throw-out collar 21. This throw-out collar carries a throw-out bearing 34, the inner race of which abuts an annular shoulder 35 formed on the collar just rearwardly of the forwardly extending arm 22. The other side of the inner race of the bearing is engaged by a snap ring 36, and the bearing is thus held in position for axial shifting with the collar. The bearing is further encircled by a throw-out member 37 having a front radial face 38 which carries, through the medium of bolts 39, a ring 40. This ring encircles the shoulder 35 of the collar and engages the inner radial face of the outer race ring of the bearing 34. The throw-out member 37 includes an inner annular shoulder 41, which engages the rear face of the outer race ring of the bearing. The member is thus also carried for axial movement with the collar 21. The member carries an appropriately arranged lubricant fitting 42 serving to admit lubricant to the throw-out bearing 34. The member is further provided with a generally flat, radial rear face 43 which serves as a brake face for purposes which will hereinafter appear.

The clutch shaft 7, as is generally conventional, is connected for conjoint rotation with a second shaft 44 in the form of a transmission shaft or the like. The association of a shaft, such as 44, with a transmission or other driving mechanism is well known to those skilled in the art and has not been further illustrated in the drawing. This shaft is provided at its forward end with a splined portion carrying for rotation therewith a connecting member 45 having an annular flange 46. This flange is connected through the medium of bolts 47 to a plurality of ears 48, only one of which is shown, rigidly carried on a coupling member 49. This member is formed at its forward end with a central opening internally splined or toothed, as at 50. This portion serves to engage an enlarged splined or toothed portion 51 formed integrally with the shaft 7 at its rear end. This end of the shaft 7 is formed with a generally flat radial face 52 for purposes which will appear later.

That portion of the coupling member 49 surrounding the toothed portion 50 is provided with a plurality of radially outwardly extending ears 53, only one of which is shown, connected through the medium of bolts 54 to a ring 55 having a central opening surrounding the shaft 7 just forwardly of its toothed portion 51. This ring 55 serves as a brake member and carries rigidly thereon for rotation therewith a brake friction member 56 having a brake face engageable by the rear brake face 43 of the clutch throw-out member 37. The member 37 is non-rotatable with respect to the clutch mechanism and shafts and includes diametrically opposed trunnions 57, only one of which is shown, engageable by the arms 58 of a throw-out fork 59 carried on a transverse rock-shaft 60 in the conventional manner. The shaft 60 is rockable through the medium of an arm or lever 61.

The coupling member 49 is provided with a radial wall or face 62 spaced axially rearwardly of the radial face 52 at the end of the shaft 7. The spacing of these faces provides an annular space 63 between inner portions of the coupling member and shaft 7. The shaft 7 is provided with an axial bore 64 extending generally from the rear end to the front end thereof, this bore providing a lubricating passage communicating with the pilot bearing 5 in the clutch driven member 2. The coupling member 49 is provided with a central cylindrical portion formed by the axial extension of an inner member or insert 65 carried thereby. This member is formed with an axial bore 66 in alinement with the bore 64 in the shaft 7, the forward radial end of the insert 65 lying in close proximity to the rear radial face 52 of the shaft 7. The coupling member 49 is provided with a radial bore 67 communicating between the exerior thereof and the axial bore 66 in the insert 65. A lubricant fitting 68 is carried in the bore 67. The bores 66 and 67 thus provide a lubricant passage in the coupling member 49 in communication with the axial bore 64 in the shaft 7, and this lubricant may be supplied through the fitting 68 to the pilot bearing 5.

A lubricant seal 69 in the form of a ring composed of appropriate material encircles the extending portion of the insert 65 within the space 63 in the coupling member and is thus interposed between the radial faces 52 and 62 of the shaft and coupling member, respectively. This seal serves to prevent escape of lubricant at the junction between the lubricant passage and bore. The lubricant fitting 68 is appropriately disposed radially inwardly of the outer extent of the coupling member ears 48 and thus lies in a generally protected position.

In operation of the clutch, the throw-out member 21 is shifted axially by the member or lever 61 either forwardly or rearwardly to engage or disengage the clutch member. Rearward movement of the lever 61 shifts the throw-out collar forwardly, thus forcing the pressure plate 19 against the friction disks 11 on the clutch driving member 3. The camming members 28, carried on the transverse shaft 25, provide an over-center lock in the usual manner for holding the clutch members in engaged position. The lugs 27 and the arms 24 engage the inner annular shoulder of the pressure plate 19, as described, and provide stop means for limiting rearward movement of the lever 61, this stop means preventing the movement of the clutch release means past the desired over-center position. The functioning of the release means is well understood by those skilled in the art. Forward movement of the lever 61 interrupts driving engagement between the clutch members, and the throw-out member 37 is shifted axially rearwardly toward the coupling member 49. It often occurs during high speed operation of the vehicle that the transmission shaft, such as 44, is rotating at such a high rate of speed as to militate against easy shifting of the transmission gearing. It is desirable, therefore, that this shaft be slowed down or braked in order to facilitate speed changes. Such a braking means is provided in the preferred construction herein illustrated wherein continued forward movement of the lever 61 shifts the throw-out member 37 axially rearwardly until the brake face 43 thereof engages the brake face on the friction ring 56 carried for rotation with the coupling members 49. As previously mentioned, the throw-out member 37 is nonrotatable and, therefore, effectively brakes the clutch shaft 7. Since this shaft is connected for conjoint rotation with the transmission 44, the latter shaft is consequently braked.

It will be seen from the foregoing description of the preferred embodiment of the invention that an improved clutch construction has been provided which comprises an improved coupling member serving to carry a brake member cooperable with a clutch throw-out means and to provide a cooperable lubricant supply member for the clutch pilot bearing.

It will be understood, of course, that the invention contemplates the provision of such a coupling member separate and apart from the clutch construction where desirable. It will be further understood that numerous other alterations and modifications may be made in the construction illustrated and described without departing from the spirit and scope of the invention as defined in the appended claims.

What is claimed is:

1. In a clutch construction having a pair of clutch members, a shaft connected to one member for rotation therewith, the other member carrying a pilot bearing journaling one end of the shaft, said shaft having an axial lubrication bore extending generally from end-to-end thereof and in communication with the pilot bearing, and a second shaft arranged at the free end of the first shaft and coaxial therewith, the combination with the first shaft of a coupling member interposed between the proximate ends of said shafts and interconnecting said shafts for conjoint rotation, said coupling including a lubricant passage communicating between the exterior thereof and the axial bore in the first shaft.

2. In a clutch construction having a pair of clutch members, a shaft connected to one member for rotation therewith, the other member carrying a pilot bearing journaling one end of the shaft, the other end of the shaft terminating in a generally flat radial face, said shaft having an axial lubricating bore extending from end-to-end thereof and in communication with the pilot bearing, a second shaft disposed coaxially with the first shaft and having one end spaced from the radial face of the first shaft, the combination with said shafts of a coupling member carried between the ends thereof and including a radial face arranged adjacent the end face of the first shaft and having connecting portions intercoupling said shaft for conjoint rotation, said member having a lubricant passage therein communicating with the axial bore of the shaft, and a lubricant seal interposed between the aforesaid faces and having an opening therein generally coincident with the junction of the passage and the bore.

3. In combination, a support, a shaft journaled on a bearing in the support, said shaft having a free end terminating in a generally flat radial face, said shaft having an axial lubricating bore extending from said end and communicating with the bearing, a second shaft disposed coaxially with the first shaft and having one end spaced from the radial face of the first shaft, and a coupling member connected between the shaft ends to couple the shafts for conjoint rotation, said member including a radial face in close proximity to the aforesaid face of the first shaft and a central portion arranged coaxial with the shafts, said member including a lubricant passage extending through its said central portion and communicating with the aforesaid axial bore in the first shaft, and a lubricant seal disposed between the radial faces of the first shaft and member and encircling the central portion of the member to seal the junction between the aforesaid passage and bore.

DAVID B. BAKER.
CLIFFORD R. ROGERS.
WILLIAM O. BECHMAN.